(12) United States Patent
Rae

(10) Patent No.: US 9,688,344 B2
(45) Date of Patent: Jun. 27, 2017

(54) SUSPENSION SYSTEM FOR THE FRONT WHEEL OF SINGLE-TRACK TWO-WHEELED VEHICLES NAMELY MOTORCYCLES AND BICYCLES

(71) Applicant: Robert Rae, Sligo (IE)

(72) Inventor: Robert Rae, Sligo (IE)

(73) Assignee: FORMCEPT TECHNOLOGIES AND SOLUTIONS PRIVATE LIMITED, Bangalore (IN)

( * ) Notice: Subject to any disclaimer, the term of this patent is extended or adjusted under 35 U.S.C. 154(b) by 0 days.

(21) Appl. No.: 14/651,613

(22) PCT Filed: Dec. 5, 2013

(86) PCT No.: PCT/IE2013/000025
§ 371 (c)(1),
(2) Date: Jun. 11, 2015

(87) PCT Pub. No.: WO2014/097285
PCT Pub. Date: Jun. 26, 2014

(65) Prior Publication Data
US 2015/0329169 A1    Nov. 19, 2015

(30) Foreign Application Priority Data
Dec. 19, 2012  (IE) .................................. 2012/0541

(51) Int. Cl.
*B62K 25/04* (2006.01)
*B62K 25/16* (2006.01)
(Continued)

(52) U.S. Cl.
CPC .............. *B62K 25/04* (2013.01); *B62K 21/18* (2013.01); *B62K 21/20* (2013.01); *B62K 25/16* (2013.01)

(58) Field of Classification Search
CPC ........ B62K 25/04; B62K 21/20; B62K 25/16; B62K 21/18
See application file for complete search history.

(56) References Cited

U.S. PATENT DOCUMENTS

| | | | | |
|---|---|---|---|---|
| 913,961 A | * | 3/1909 | Levedahl ............... | B62K 25/24 280/276 |
| 4,179,135 A | * | 12/1979 | Slater .................... | B62K 25/24 280/276 |

(Continued)

FOREIGN PATENT DOCUMENTS

| | | |
|---|---|---|
| EP | 0236196 A1 | 9/1987 |
| GB | 2021496 A | 12/1979 |

(Continued)

*Primary Examiner* — Kevin Hurley
*Assistant Examiner* — Gabriela C Craciun
(74) *Attorney, Agent, or Firm* — Luoh J. Wu

(57) ABSTRACT

A linkage front wheel suspension system for two-wheeled vehicles comprising of a control arm hinged with the body of the vehicle, fork member, and steering member. An upper ball joint connects said steering member to the body of the vehicle and a lower ball joint connects the outer end of said control arm with said fork member. Fork member extends upwards and rearwards from said lower ball joint to hinge with said steering member. Steering member extends upwards and forwards from this pivot point to said upper ball joint. A method of steering control connects with said steering member. Means of springing/dampening connects with at least one of the said steering/suspension members. Said suspension system can utilize a lighter design of main frame, provide superior road-holding and can have reduced compression when front wheel braking.

3 Claims, 2 Drawing Sheets

(51) Int. Cl.
    *B62K 21/18*    (2006.01)
    *B62K 21/20*    (2006.01)

(56) References Cited

U.S. PATENT DOCUMENTS

| | | | | |
|---|---|---|---|---|
| 4,433,851 | A * | 2/1984 | Miyakoshi | B62K 25/24 188/303 |
| 4,629,205 | A * | 12/1986 | Haynes | B62K 25/08 280/277 |
| 4,789,174 | A * | 12/1988 | Lawwill | B62K 25/14 280/284 |
| 5,069,467 | A * | 12/1991 | Claudio | B62K 25/24 280/276 |
| 5,599,034 | A * | 2/1997 | Brigden | B62K 21/08 280/276 |
| 6,336,647 | B1 * | 1/2002 | Iwai | B62K 25/08 180/219 |
| 6,910,702 | B1 * | 6/2005 | Hals | B62K 21/20 280/283 |
| 7,896,379 | B2 * | 3/2011 | Nagao | B62K 25/24 280/276 |
| 8,162,342 | B2 * | 4/2012 | Chen | B62K 25/24 280/276 |
| 8,827,295 | B2 * | 9/2014 | Lavabre | B62K 25/24 280/277 |
| 8,998,231 | B2 * | 4/2015 | Neeley | B62K 23/00 188/299.1 |
| 2005/0082785 | A1 * | 4/2005 | Mydlarz | B62K 21/20 280/276 |
| 2005/0184483 | A1 * | 8/2005 | Buckley | B62K 25/286 280/284 |
| 2006/0220343 | A1 * | 10/2006 | Wimmer | B62K 17/00 280/276 |
| 2009/0315296 | A1 * | 12/2009 | Berthold | B62K 25/286 280/284 |
| 2011/0202236 | A1 * | 8/2011 | Galasso | B62K 25/04 701/37 |
| 2014/0001729 | A1 * | 1/2014 | Hudec | B62K 25/28 280/283 |
| 2015/0274249 | A1 * | 10/2015 | Kuwabara | B62K 21/00 280/276 |
| 2015/0274250 | A1 * | 10/2015 | Kuwabara | B62K 25/24 280/276 |

FOREIGN PATENT DOCUMENTS

| | | |
|---|---|---|
| GB | 2348628 A | 10/2000 |
| IE | 86523 B1 | 4/2015 |
| WO | 9828183 A1 | 7/1998 |

* cited by examiner

US 9,688,344 B2

SUSPENSION SYSTEM FOR THE FRONT WHEEL OF SINGLE-TRACK TWO-WHEELED VEHICLES NAMELY MOTORCYCLES AND BICYCLES

FIELD OF THE INVENTION

The invention disclosed herein is generally related to motorcycles and bicycles. More particular, the present invention is related to suspension and steering systems for the front wheel of single-track two-wheeled vehicles.

BACKGROUND

Modern motorcycles and bicycles with front suspension systems are equipped universally with a fork type system. Such a system includes a pair of telescopic tubes that are inverted one inside the other and contain internal springs or springs and dampeners. The fork tubes are connected through a head assembly to a freely rotating steering column that is attached to the main frame of the vehicle. An axle for the front wheel is fixed perpendicular to the lower ends of said fork tubes. This simple structure is an effective front suspension design but nevertheless suffers from certain disadvantages which have long been recognised but never completely overcome. The main disadvantages associated with this design are, shock loads from the road surface onto the front suspension are directed towards the frame in the vicinity of the steering head area, which is far removed from the centre of gravity of the vehicle, where frame construction is relatively light but the displacing wheel and lower sections of the forks are of considerable mass. This results in shock loads only being partially absorbed and transmits considerable load from the suspension in the direction of the frame, which invariably causes the frame to pitch. There is also a tendency for the vehicle to 'dive', or pitch forwards and downwards, during hard braking of the front wheel due to the telescopic forks being raked out where displacement of the front wheel is both upwards and rearwards. Further, with telescopic forks the load path of the shock loads to the frame is convoluted, where the steering head area and associated components have to be substantially stronger and heavier than need be if it were only to accommodate the torque necessary to effect steering.

As a general design principle, it is desirable that weight and road loads be transmitted in the simplest and shortest possible manner in order to minimise the weight of the structures which must transmit and bear these loads. It is further desirable to have the most direct connection between the front wheel axle and the mechanisms used for steering control of the front wheel. It is also desirable to have as few moving components in a suspension system as possible, so to reduce complication, manufacturing costs, and also to reduce the inertia associated with both steering motion and suspension action. It is further desirable for the standpoint of safety to resist excessive diving of the front suspension during front wheel braking. Further, in general, it is desirable to minimise pitching motion at the handlebars.

STATEMENT OF INVENTION

Accordingly, it is the object and purpose of this invention to provide an improved suspension and steering system for the front wheel of the bicycle/motorcycle.

In this regard it is a more specific objective of the present invention to provide in a single-track two-wheeled vehicle a linkage front suspension of only three main structural moving components with a manual method of steering control and a method of springing/dampening. It is another objective of this invention to provide in a vehicle a front suspension system that minimises diving during front wheel braking. It is another objective of the present invention to provide in a bicycle/motorcycle a suspension system which will minimise pitching motion at the handlebars, or other methods used for steering control. It is another objective of the present invention to provide in a vehicle a front suspension system that can utilise a lighter design of body/frame structure. A final objective of this invention is to provide in a two-wheeled vehicle superior road-holding for the different dynamic conditions encountered.

BRIEF DESCRIPTION OF THE DRAWINGS

The invention will be more clearly understood from the accompanying drawings, given only as example and are not deemed accurate in likeness or detail, in which.

SUMMARY OF THE INVENTION

Figure 1:
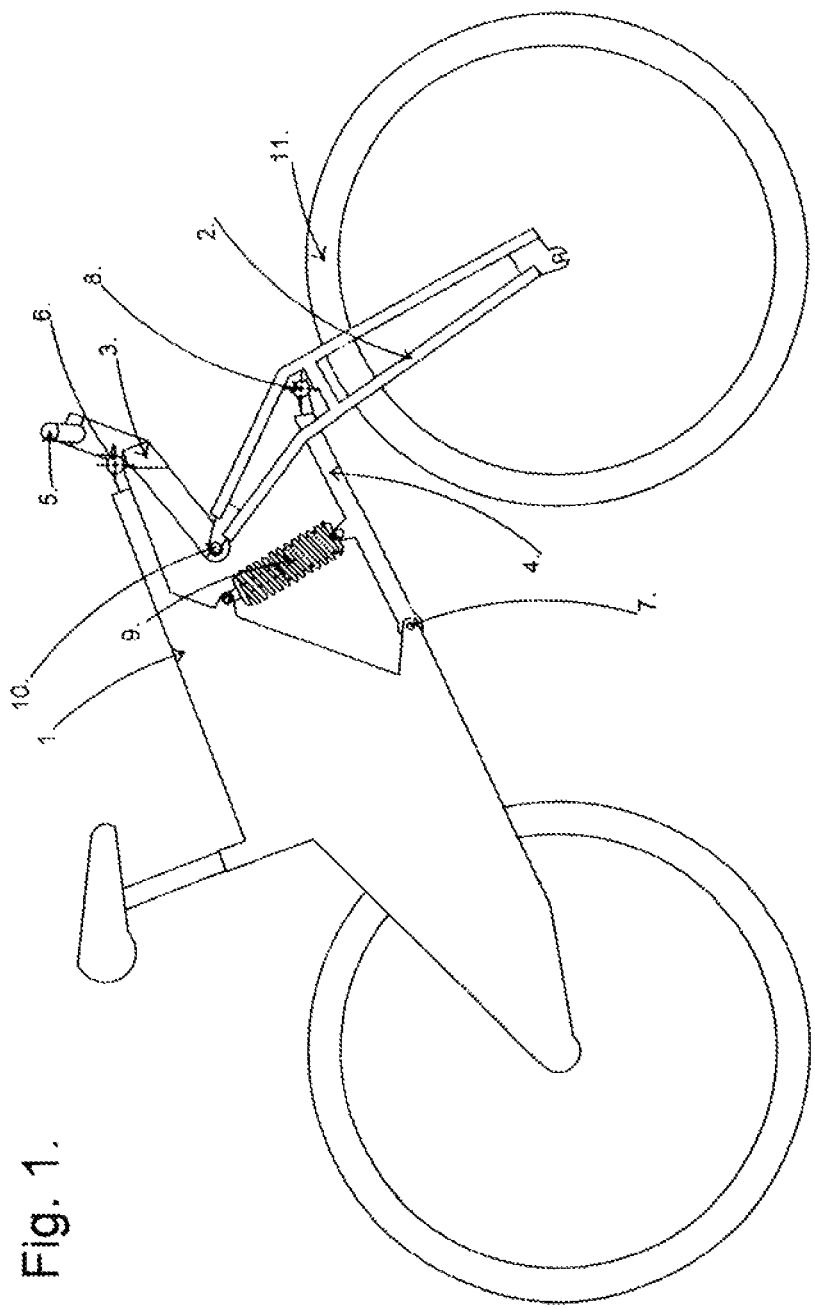
FIG. 1 illustrates a side view of the preferred embodiment of the invention.

The foregoing and other objectives are attained in the present invention, which relates to a single-track two-wheeled vehicle having a main frame structure; a front wheel with a mechanical method of suspension comprising of at least three main structural components incorporating an upper quadrilateral construction with the frame structure in conjunction with an extending lower structural fork portion to support the front wheel; a method of steering control in an upper position; and, springing and/or dampening unit/s in control of front wheel suspension action.

DETAILED DESCRIPTION OF THE INVENTION

The suspension system includes a control arm (4) hinged with the body/frame structure (1) of the vehicle, extending forward from a pivot point (7) on the said frame structure along the longitudinal plane of which, for substantially vertical swinging motion at its outward end. The hinged pivot point (7) with the frame structure will have an axis of rotation extending transversely in respect to the longitudinal plane of the control atm (4). Attached at the outward end of said control arm (4) is a ball joint (8), or similar, permitting universal movement, where said ball joint (8), or similar, further attaches to a fork member (2).

The said lower ball joint (8), or similar, lies in the central longitudinal plane of the vehicle, which also corresponds with the centre plane of the front wheel (11) when it is in its unturned position. Said front wheel (11) is positioned below said lower ball joint (8) or similar means of universal movement.

The fork member (2) is connected to said control arm (4) by means of this ball joint (8), or similar means of universal joint, which permits universal movement. From there said fork (2) extends downward and forward on either side of the front wheel (11) to a position at its lower end to receive the axle for the front wheel (11). Said fork member (2) further extends upward and rearward of this position of attachment with said ball joint (8), or similar, to hinge at its upper end with a steering member (3). This hinged pivot point (10) has an axis of rotation extending transversely in respect to the longitudinal plane of the fork member (2). This hinge axis of the steering member (3) and fork member (2) will always remain in parallel with the axle of the front wheel (11) once the wheel is turned from its straight ahead position.

The steering member (3) extends upward and forward from its attachment at the pivot point (10) where it hinges with said fork member (2) to where there is second attachment, by means of an upper ball joint (6), or similar, which permits universal movement, and is further attached with the body/frame structure (1) of the vehicle by means of this ball joint (6), or similar, where this area can be considered the steering head much in the same manner of that of a conventional design of motorcycle/bicycle. Handlebars (5), or other methods used for steering control, when positioned in their ordinary position for the function of manual steering control will be in the vicinity of the said upper ball joint (6), or similar means of universal movement. The handlebars (5), or other methods used for steering control, are an integrated part of, attached to, or connect by mechanical means with said steering member (3) in a rigid manner and will be so formed with adequate clearance of other components to allow a full range of steering motion.

The upper ball joint (6), or similar means of universal joint, is in the central longitudinal plane of the vehicle, which also corresponds with the centre plane of the front wheel (11) when it is in its unturned position. Said upper ball joint (6), or alternative means of universal movement, in conjunction with the lower ball joint (8), or alternative means of universal movement, together provide the steering axis, which is raked out positioned and orientated much in the same manner of that of a conventional design of single-track two-wheeled vehicle. When the suspension system compresses the lower ball joint (8), or similar, will displace upwards towards the upper ball joint (6), or similar, in a path that will retain the steering head angle much in the same manner described, where said ball joints (6 & 8), or similar, will always remain at a substantial distance from each other even when at full compression of the suspension system. As a result of the quadrilateral construction of the suspension system travel of the front wheel (11) can be in a substantially vertical direction. These universal joints (6 & 8) allow the front wheel (11) fork member (2) and steering member (3) to undergo rotational steering motion about the said steering axis and for the front wheel (11) fork member (2) and lower end of the steering member (3) to also undergo vertical motion in response to road shocks. Steering motion is exerted onto the front wheel (11) by means of the handlebars (5), or other methods used for steering control, turning on the steering axis provided by said universal joints (6 & 8), where this motion is applied via said steering member (3) and said fork member (2).

The main body/frame structure (1) of the vehicle will be formed where adequate clearance is provided to allow a full range of steering and suspension motion of the front wheel (11) and all components of the suspension/steering system.

Suspension travel of the front wheel (11) will be controlled and dampened by a method of springing and/or dampening, which will be attached, or connected by mechanical means, to at least one of the three main structural components of the described front suspension system. In a preferred embodiment of this invention, as referred to in FIG. 1 of the drawings, at least one dampening and/or springing unit (9) will be attached, or connected by mechanical means, to the said control arm (4), or be connected to a pivoted mechanical linkage arrangement that may comprise of various strut/s and/or levees and/or rocker arms relative to and controlled by this front suspension control arm (4), in control of front wheel (11) suspension action. At least one said springing and/or dampening unit/s (9) will have its/their outer end/s directed towards the main body/frame structure (1) of the vehicle.

Figure 2:
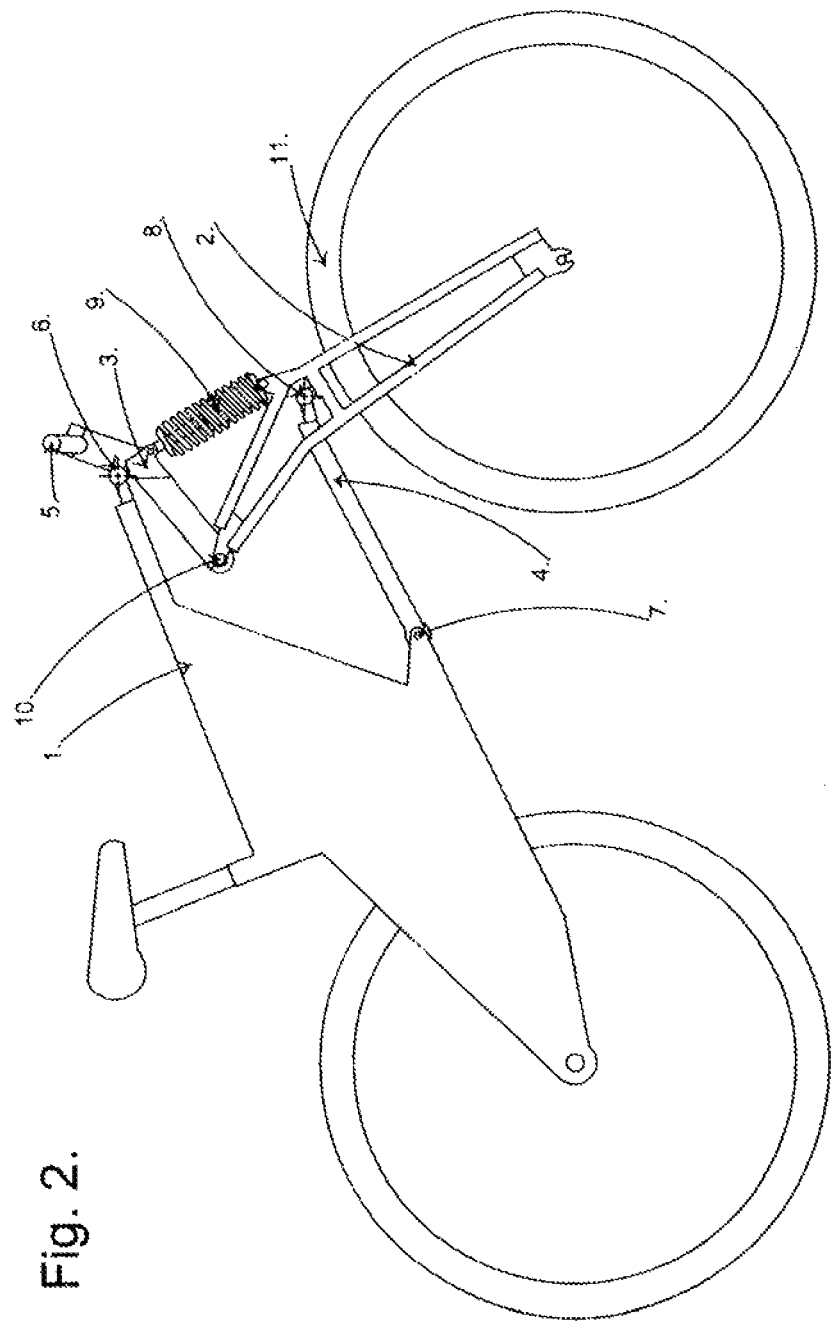
FIG. 2 illustrates a side view of another embodiment of the invention.

In another embodiment of this invention, as referred to in FIG. 2 of the drawings, at least one springing and/or dampening unit (9) will be attached, or be connected by mechanical means, to the fork member (2) with the other end of the unit/s (9) attached, or connected by mechanical means, to the steering member (3). Alternatively, at least one shock absorbing unit (9) will be connected to a mechanical linkage arrangement which may comprise of various strut/s and/or lever/s and/or rocker arm/s relative to and controlled by the fork member (2), or relative to and controlled by the steering member (3), or be connected to two mechanical linkages one relative to and controlled by the fork member (2) with the other relative to and controlled by the steering member (3).

Alternatively, when control of front suspension action utilises more than one springing and/or dampening unit (9), unit/s (9) can have a connection with the steering (3) and fork members (2), and unit/s (9) can have a connection with the control arm (4) with the outer end/s directed towards the main body/frame structure (1) of the vehicle.

Mechanisms or methods of springing and/or dampening can operate in compression tension shear twisting or bending mode, or by a combination of which. Attachment of dampening/springing mechanisms with steering/suspension components can be so orientated to operate in compression tension shear twisting or bending.

In this detailed arrangement, when this front suspension system has experienced an obstacle, or any other means to initiate motion of the front suspension system, the fork member (2) and outer end of the said control arm (4) will travel in a generally upwards direction whereby causing the steering member (3) to rotate around the said upper ball joint (6), or similar means of universal movement, by influence of its connection at the hinged pivot point (10). The lower portion of the steering member (3) will travel backwards and upwards of its static position and the handlebars (5), or alternative means of steering control, will also partially rotate about the upper means of universal movement (6) in the same rotational plane.

When front wheel braking forces in conjunction with weight transfer act to compress the front suspension system, when utilising suspension travel in a direction closer to vertical than with a conventional design of vehicle equipped with telescopic forks, the shock absorbing unit/s (9) will compress less to effect reduced diving of the front suspension and provide ample free suspension travel during front wheel (11) braking to enhance road holding ability.

Since attachment of influential dampening and/or springing methods bearing primary weight and shock loads are transmitted through pivoted suspension members and not necessarily directly to the body/frame structure (1) of the vehicle, with the upper means of universal movement (6) and the pivot point (7) for the control arm on the body/frame structure (1) of the motorcycle/bicycle set sufficiently apart to reduce the leverage effect, superior structural strength and stiffness could only be required on the frame structure (1) at these points, therewith frame construction could be made lighter than otherwise obtained in a conventional design of two-wheeled vehicle equipped with telescopic forks. Further, with the handlebars (5) and steering member (3) attaching rigidly, or when they are integrated with each other, together both can be considered as a single member, with such consideration, there are only three moving members required for suspension motion, of which only two of these members are orienting solely for rotational steering motion, where with this lack of complication it can be to the benefit of manufacturing costs thereof, weight saving and performance in respect to vehicle handling and road-holding ability.

An adequate braking system may be attached to any position of the various described suspension/steering members, where such a braking system may operate on the front wheel (11) or on a tire rim spokes hub disc drum or any other part relative to the rotating front wheel (11).

The described suspension system can be utilised in all types of single-track two-wheeled bicycles and motorcycles including that of electrical bicycles, commonly referred to as E-bikes.

These aspects of the present invention are set forth in the accompanying drawing of the invention.

DRAWING

The accompanying drawings are solely to illustrate the invention and are not deemed an accurate depiction of components or mechanisms.

FIG. 1. A side view of a representation of a vehicle for which patent protection is sought. Where 1 is the body/frame structure; 2 is the fork member; 3 is the steering member; 4 is the control arm; 5 is the handlebars; 6 is the upper means of universal movement; 7 is the pivot point of the control arm; 8 is the lower means of universal movement; 9 is the dampening and/or springing unit; 10 is the pivot point of the fork and steering member; and, 11 is the front wheel.

FIG. 2. A side view of a representation of a vehicle demonstrating another embodiment for which patent protection is sought. Where 1 is the body/frame structure; 2 is the fork member; 3 is the steering member; 4 is the control arm; 5 is the handlebars; 6 is the upper means of universal movement; 7 is the pivot point of the control arm; 8 is the lower means of universal movement; 9 is the dampening and/or springing unit; 10 is the pivot point of the fork and steering member; and, 11 is the front wheel.

The invention claimed is:

1. A front wheel suspension system of a single-track two-wheeled vehicle, comprising:
   a frame structure of said vehicle;
   a control arm;
   a fork member;
   a steering member;
   a means of dampening/springing;
   and, a wheel with an axle;
   said control arm hinges at a first pivot point at a rearward portion with said frame structure to extend forward to be firstly coupled in a rotatable manner at a forward portion with said fork member,
   said fork member receives the axle of said wheel at a lower portion to extend upwards and rearwards to a first coupling with said control arm to then extend upwards and rearwards from said first coupling to hinge at an upper portion at a second pivot point with said steering member,
   said steering member extends upwards and forwards from where it connects at said second pivot point to a second coupling in a rotatable manner with said frame structure,
   a means of steering control connects with said steering member,
   and, said means of dampening/springing has at least one connection with said fork member or said steering member or said control arm of said suspension system.

2. A front wheel suspension system of a single-track two-wheeled vehicle as defined in previous claim 1;
   where the means of dampening/springing (9) has a mechanical connection with said control arm (4).

3. A front wheel suspension system of a single-track two-wheeled vehicle as defined in previous claim 1;
   where the means of dampening/springing (9) has a mechanical connection at a first end with said fork member (2) and has a mechanical connection at a second end with said steering member (3).

\* \* \* \* \*